United States Patent
Land et al.

(10) Patent No.: US 10,228,277 B1
(45) Date of Patent: Mar. 12, 2019

(54) SYSTEM AND METHOD TO DETECT SIGNATURES FROM AN UNDERWATER OBJECT

(71) Applicant: The United States of America as Represented by the Secretary of the Navy, Washington, DC (US)

(72) Inventors: Phillip P. Land, Ridgecrest, CA (US); Arun K. Majumdar, Oxnard, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 207 days.

(21) Appl. No.: 15/374,298

(22) Filed: Dec. 9, 2016

(51) Int. Cl.
  *G01H 9/00* (2006.01)
  *G01S 15/00* (2006.01)
  *G01S 17/00* (2006.01)
  *G01S 17/02* (2006.01)
  *G01S 15/02* (2006.01)
  *G01S 15/04* (2006.01)

(52) U.S. Cl.
  CPC ............ *G01H 9/00* (2013.01); *G01S 15/025* (2013.01); *G01S 15/04* (2013.01); *G01S 17/023* (2013.01); *G01S 17/026* (2013.01)

(58) Field of Classification Search
  CPC ...... G01S 17/026; G01S 17/58; G01S 17/895; G01S 17/74; G01S 15/89; G01S 15/025; G01S 7/4808; G01S 7/4815; G01S 7/481; G01S 7/006; G01S 15/04; G01S 17/023; G01H 9/00
  See application file for complete search history.

(56) References Cited

U.S. PATENT DOCUMENTS

| | | | | |
|---|---|---|---|---|
| 3,153,236 A * | 10/1964 | Rines | ...................... | G01S 13/04 342/192 |
| 4,991,149 A * | 2/1991 | Maccabee | ................. | G01S 3/80 367/128 |
| 5,060,206 A * | 10/1991 | DeMetz, Sr. | .......... | G01V 1/001 367/136 |
| 5,646,907 A * | 7/1997 | Maccabee | ............... | G01S 15/04 250/492.1 |
| 6,058,071 A * | 5/2000 | Woodall | ................. | H04B 11/00 367/134 |
| 6,813,218 B1 * | 11/2004 | Antonelli | ................. | G01S 17/74 367/134 |
| 6,859,419 B1 * | 2/2005 | Blackmon | .............. | H04B 11/00 367/134 |
| 7,113,447 B1 * | 9/2006 | Matthews | ............. | G01F 1/7082 356/28.5 |
| 7,259,864 B1 * | 8/2007 | Antonelli | ................. | G01H 9/00 356/502 |

(Continued)

*Primary Examiner* — Helen C Kwok
(74) *Attorney, Agent, or Firm* — James M. Saunders

(57) ABSTRACT

Embodiments of the invention are directed to detecting an underwater object from an air-based system. The air-based system is associated with at least one controller. A broadband acousto-optic signal detection device is associated with the air-based platform. The broadband acousto-optic signal detection device is configured to emit a laser beam at an underwater object. The laser beam terminates at the underwater object and reflects back as a return laser beam. The broadband acousto-optic signal detection device is configured to detect and receive the return laser beam.

9 Claims, 7 Drawing Sheets

(56) References Cited

U.S. PATENT DOCUMENTS

| | | | | |
|---|---|---|---|---|
| 8,179,535 B2* | 5/2012 | Martin | ............... | H04B 11/00 |
| | | | | 356/502 |
| 8,223,590 B2* | 7/2012 | Jones | ............... | G01S 15/003 |
| | | | | 367/128 |
| 8,797,828 B1* | 8/2014 | Lev | ............... | G01V 8/00 |
| | | | | 356/486 |
| 2016/0252616 A1* | 9/2016 | Wilby | ............... | G01S 15/89 |
| | | | | 367/7 |

* cited by examiner

US 10,228,277 B1

SYSTEM AND METHOD TO DETECT SIGNATURES FROM AN UNDERWATER OBJECT

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

Embodiments of the invention generally relate to mitigating signal distortions caused by air and random air-water interface turbulence.

Figure 1:
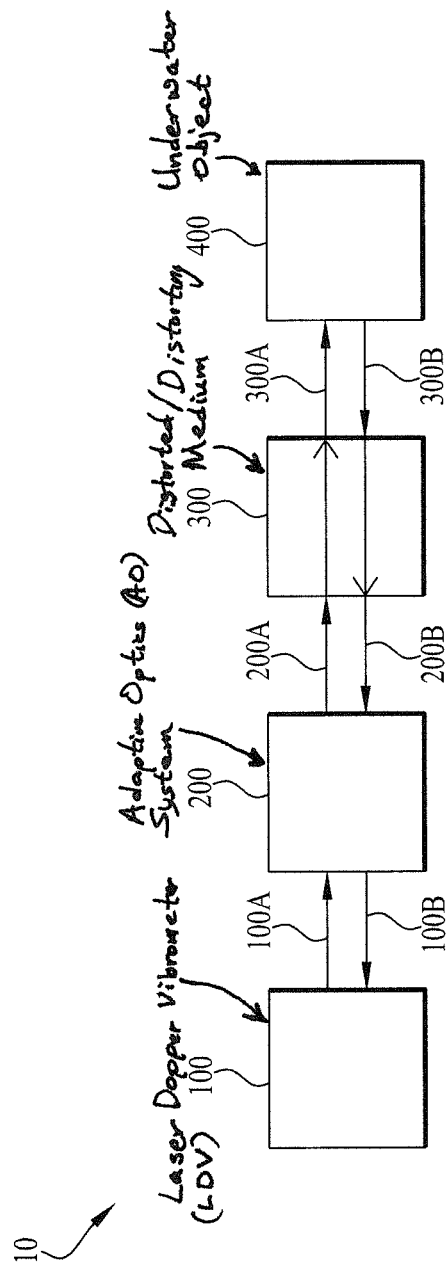
FIG. 1 illustrates an exemplary block diagram for a system for sensing and detecting an acoustic signal from an underwater object, according to some embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Significant signal distortion occurs due to turbulent flow conditions in both atmospheric and random air-water interface regions. Embodiments of the invention mitigate the signal distortions by integrating a Laser Doppler Vibrometer (LDV) with an Adaptive Optics (AO) system for sensing and detecting signatures from an underwater object by sensing the acoustic signals originated from the underwater object. As described herein, embodiments of the invention are directed to non-transitory signals. The LDV signal is enhanced while it passes through a complex random air-water interface as well as atmospheric turbulence. Hence, embodiments of the invention can be considered a remote sensing technique that stabilizes and aims a laser beam onto an object underneath the water and detects a reflected beam back from the object.

Embodiments of the invention use an optical technique of remotely detecting the signature of the presence of an underwater object by measuring the acoustic signals originated from the object. Embodiments can detect underwater objects having a reflective surface. Embodiments are equally applicable to both stationary and moving underwater objects. The method of detection is based on stabilizing a laser beam from an airborne platform which otherwise is distorted when propagating through atmospheric turbulence and random air-water interface turbulence. The airborne platform is sometimes referred to as an air-based platform. Embodiments employ a sensor that integrates the LDV and the AO system, both of which are co-located on the airborne platform. A person having ordinary skill in the art will recognize that stabilizing means keeping the laser beam fixed in the presence of atmospheric and water distortions.

Embodiments can detect acoustic signals from many objects and sources due to a detection range from about a few hertz to tens and hundreds of kilohertz. A person having ordinary skill in the art will recognize that the underwater object can be referred to as an object, object of interest, and target, without detracting from the merits or generalities of embodiments of the invention.

Embodiments of the invention detect a broadband acousto-optic signal from an underwater object by stabilizing a transmitted laser beam propagated through a distorted medium. The distorted medium has both atmospheric turbulence and random air-water interface turbulence. The laser beam is stabilized by applying an adaptive optics (AO) technique to a laser Doppler vibrometer (LDV) output beam. The LDV vibrometer output beam is used to detect an acoustic optical signal generated by the underwater object.

The distorted medium interferes with the acoustic signals generated by the underwater object. The resultant acoustic-optical signal generated by the underwater object is sensed and then is routed back to the LDV after the AO system corrects the distortions and stabilizes the return beam. The wavefront sensor senses the resultant acoustic-optical signal and stabilizes the return beam. The wavefront sensor is physically-connected by a wire to both the fast steering mirror and the deformable mirror. The wavefront sensor provides feedback to both the fast steering mirror and the deformable mirror.

The corrections of the distorted laser beam in both the atmospheric turbulence and the random air-water interface turbulence is performed by applying the AO technique. The AO technique measures the quantitative distortions with the wavefront sensor. Lower-order modes are mitigated with at least one fast-steering mirror (FSM). Higher-order modes are mitigated using at least one deformable mirror (DM) by correcting the distortions using phase-conjugation. The lower and higher order modes are processed with a feedback control system.

Although embodiments of the invention are described in considerable detail, including references to certain versions thereof, other versions are possible. Examples of other versions include performing the tasks in an alternate sequence or hosting embodiments on different platforms.

Therefore, the spirit and scope of the appended claims should not be limited to the description of versions included herein.

Figure 2:
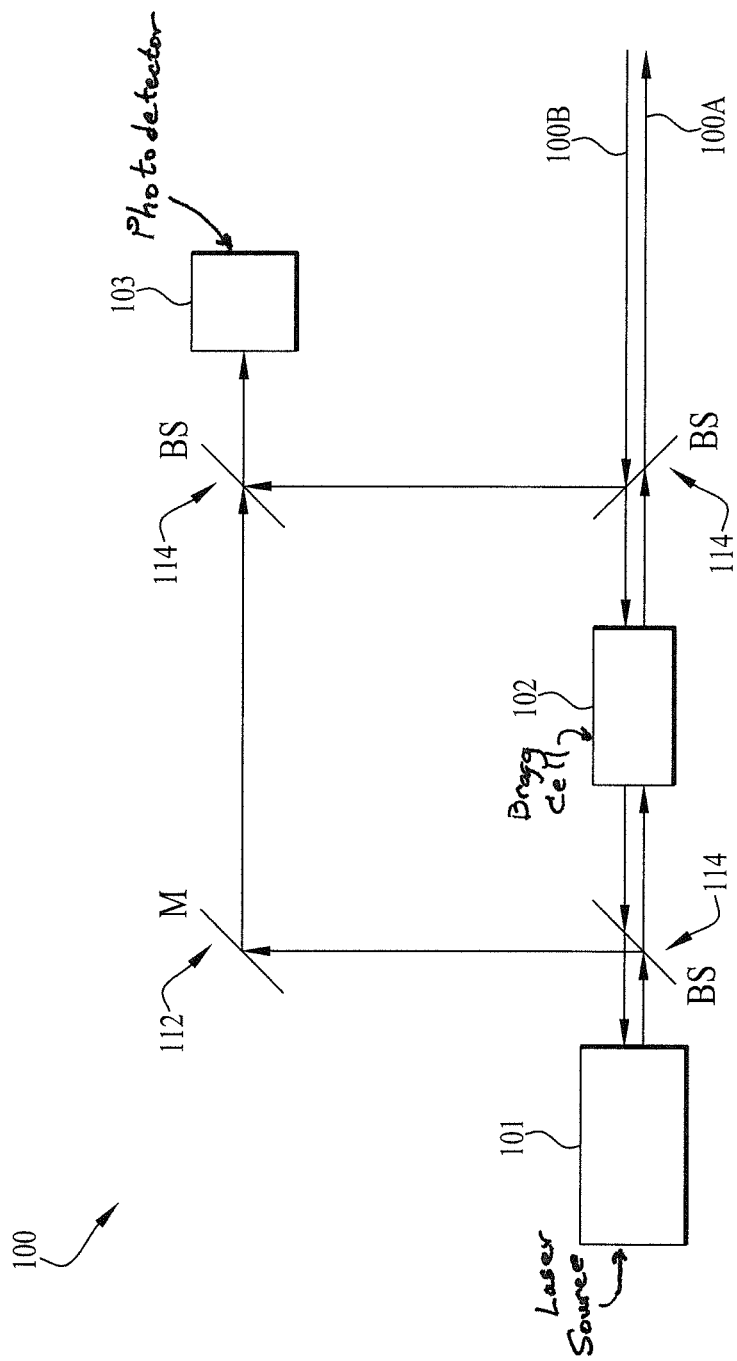
FIG. 2 illustrates functional components of a Laser Doppler Vibrometer (LDV), according to some embodiments of the invention.
Figure 3:
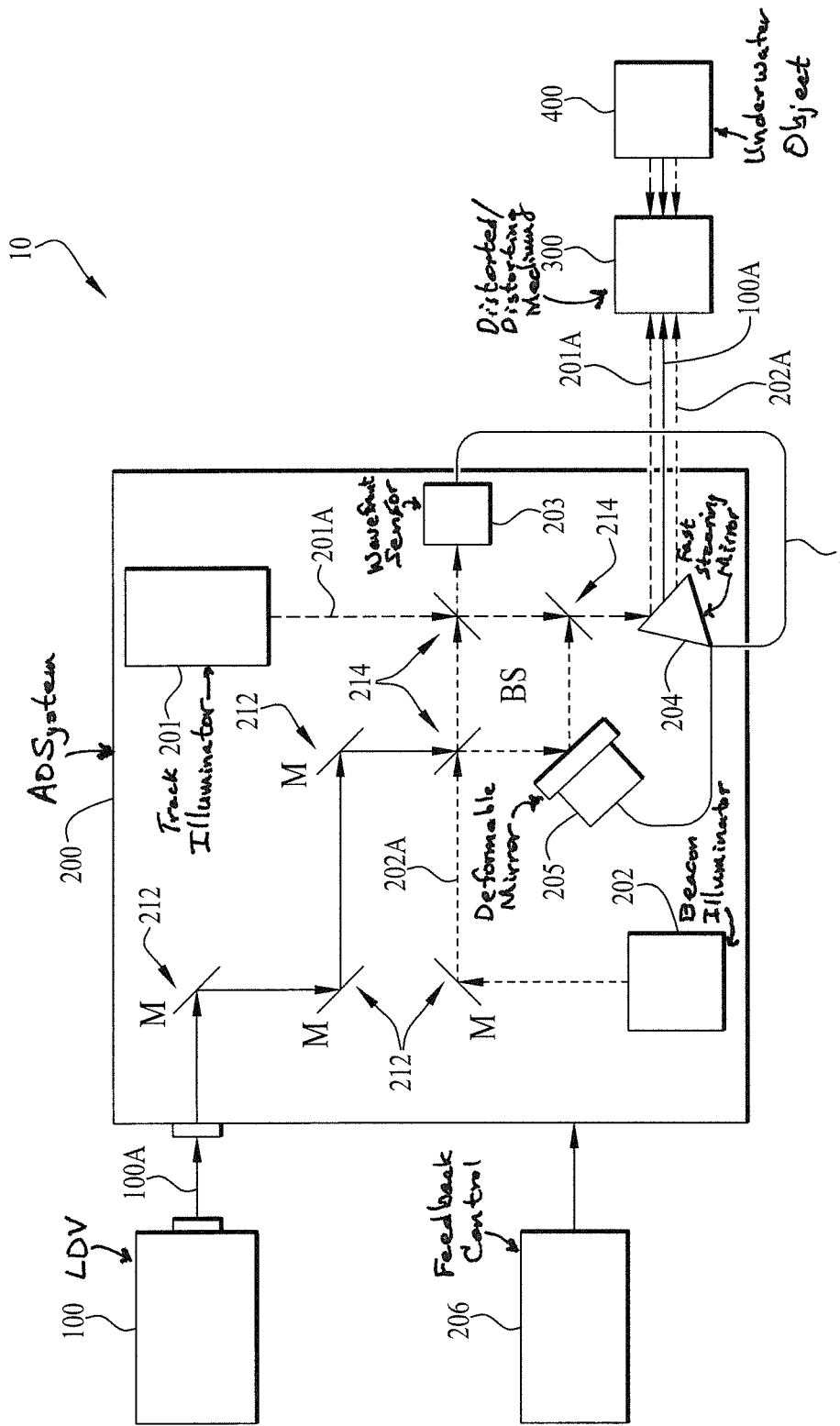
FIG. 3 illustrates an exemplary block diagram and components in FIGS. 1 & 2 combined with the functional components of an Adaptive Optics (AO) system, according to some embodiments of the invention.

Block Diagram of a System with Functional Components—FIGS. 1, 2, & 3

In the accompanying drawings, like reference numbers indicate like elements. In the block diagram in FIG. 1, a system according to embodiments of the invention is depicted. Reference character 10 depicts a system, according to embodiments of the invention, as well as its operating environment. The system 10 is configured for sensing and detecting an acoustic signal generated by an underwater object, which can also be referred to as a source of the reflected beam, source, and the like.

The system 10 includes an Optical-based Sensor 100, an LDV in this illustration, and an AO system 200. The LDV 100 is used to make non-contact measurements of a surface of the object 400. The vibration amplitude and frequency are extracted from the Doppler shift of the laser beam frequency due to the relative motion of the object generating the vibration.

FIG. 2 illustrates the functional components of the LDV 100 and includes a combination of beam splitters (abbreviated as BS and depicted as reference character 114) and a mirror (abbreviated as M and depicted with reference character 112) for directing and receiving the optical beams, a Bragg Cell 102, and a Photo Detector 103. The LDV 100 is configured as a combination of modules, which together produce a Doppler frequency shift, proportional to object velocity, the laser light wavelength and the angle between the laser beam direction and the vibration velocity vector. The LDV 100 probes and penetrates through a distorting medium 300, sometimes referred to as a distorted medium. In embodiments of the invention, the distorting medium 300 includes both atmospheric and random air-water surface (interface) distortions. A beam then reflects back (a reflected beam) from the object 400 (sometimes referred to as a vibrating object). The LDV 100 detects the acoustic signal via surface perturbation caused by the impinging acoustic pressure field. The incoming laser signal containing the acoustic signal information which is already generated by the object 400 pass through an Adaptive Optics (AO) system 200, where it is corrected for the random distortions (caused by air-water interface, and the water surface, and the atmospheric conditions) of the laser signal to be detected by the Photo Detector 103. Reference character 100A depicts the outgoing laser beam/signal from the LDV 100. Reference character 100B depicts the incoming laser beam/signal back to the LDV 100. Reference character 200A depicts the outgoing laser beam/signal from the AO system 200. Reference character 200B depicts the return laser beam/signal from the object 400, through the distorted medium 300, and back into the AO 200. Reference character 300A depicts the laser beam/signal out of the distorted medium 300 and to the object 400. Reference character 300B depicts the laser beam/signal returned (reflected) from the object 400 and back into the distorted medium 300.

FIG. 3 provides the overall block diagram of the combined LDV 100 and AO system 200 showing the different modules and how they are connected with each other as well as the operating environment in block diagram form. The AO system 200 is used to compensate air-water interface-induced random image distortions and includes an integrated Beacon Illuminator (BILL) 202, Track Illuminator (TILL) 201, and a wavefront sensor 203 that can be used for an object that provides BILL return from the object.

As shown in FIG. 3 the AO system 200 includes a fast steering mirror 204, a deformable mirror 205, and a Wavefront Sensor 203 for mitigating the air-water surface distortions. The AO system 200 includes a combination of beam splitters (abbreviated as BS and depicted as reference character 214) and mirrors (abbreviated as M and depicted with reference character 212) for directing and receiving the optical beams. The AO system 200 mathematically takes the complex conjugate of the random phase caused by air-water interface allowing the laser beam to penetrate through the water by cancelling with the complex conjugate. The return optical signal reflected from the object 400 and distorted back again by the air-water surface is mitigated when reaching back to the LDV 100 for sensing and optically detecting the acoustic signal generated and originated at the object. The AO system feedback control is depicted by reference character 206, which represents the plurality of computer executable instructions used for signal processing.

As shown in FIGS. 1 & 3, the distorted medium is represented by 300 where three laser beams are shown with reference characters 201A, 202A, & 100A. The laser beam from the TILL 201 is depicted by reference character 201A. The laser beam from the BILL 202 is depicted with reference character 202A. The laser beam from the LDV 100 is depicted with reference character 100A. The three laser beams 201A, 202A, and 100A simultaneously propagate through the distorting medium 300, illuminate the underwater object 400 and reflect back after performing the distortion corrections where the corrected LDV laser signal (the return laser back to the LDV) 100B is reflected back towards the LDV 100 where the signal is interferometrically processed for acoustic signal sensing/detection.

Working Laboratory System Example and Test Results—FIGS. 4A Through 4D

Significant laboratory testing to prove the feasibility of embodiments of the invention was conducted with a water tank equipped with a fan to produce air-water surface randomness. FIGS. 4A through 4D are directed to a laboratory testing system to detect an underwater object, according to embodiments of the invention. Metrics to measure the success of embodiments of the invention are graphically displayed in FIGS. 4A through 4C. The AO improvements are measured using the Strehl ratio. In general, the Strehl ratio is the percent return (reflection) from an object. In embodiments of the invention, the AO improvement is measured by the Strehl ratio, defined by the acoustic-optical signal increase at the AO-on mode compared to the signal at AO-off mode. The metric Strehl ratio also is sensitive to the different acoustic signal bandwidth generated by the underwater object/source, thus providing a means of optimizing the presence or absence of the source by optimizing the observed signal strength. Embodiments of the invention can provide the results for AO gain in DB of the detected LDV signal within the various broad frequency range of a few Hz to 10s to 100s of kHz.

Figure 4A:
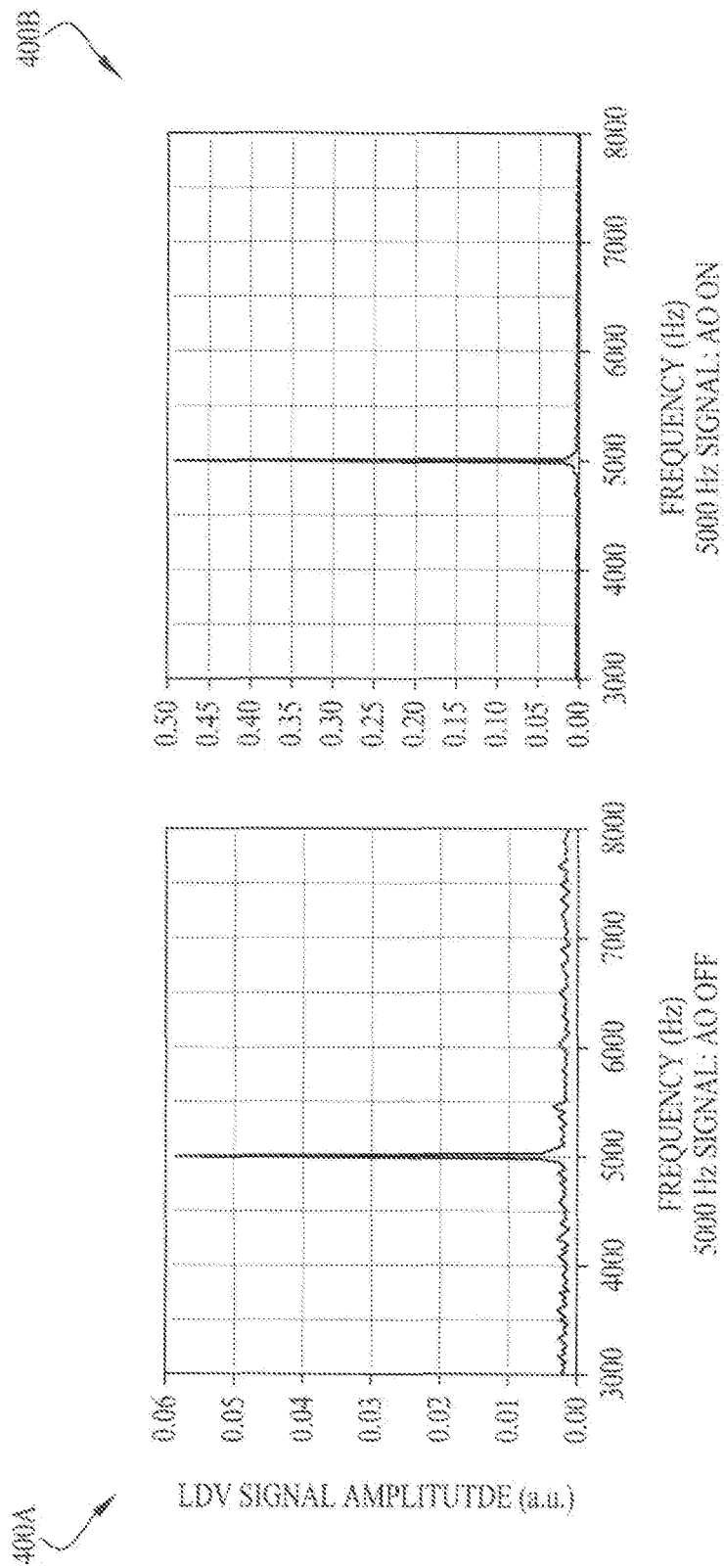
FIG. 4A depicts exemplary graphical representations on a computer display screen of an LDV signal amplitude at a frequency of 5000 Hz at both the AO-off and AO-on conditions.
Figure 4B:
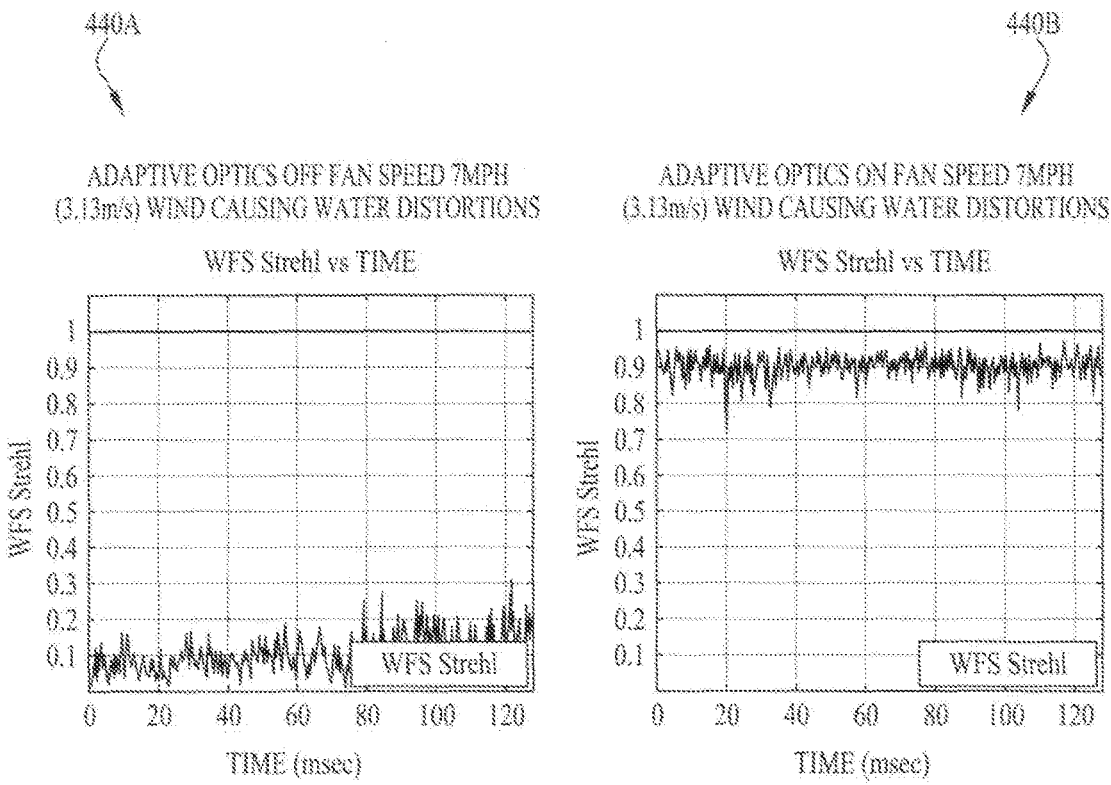
FIG. 4B depicts exemplary graphical representations of the average Strehl ratio results for a 7 mile per hour fan-generated wind speed at both the AO-off and AO-on conditions.
Figure 4C:
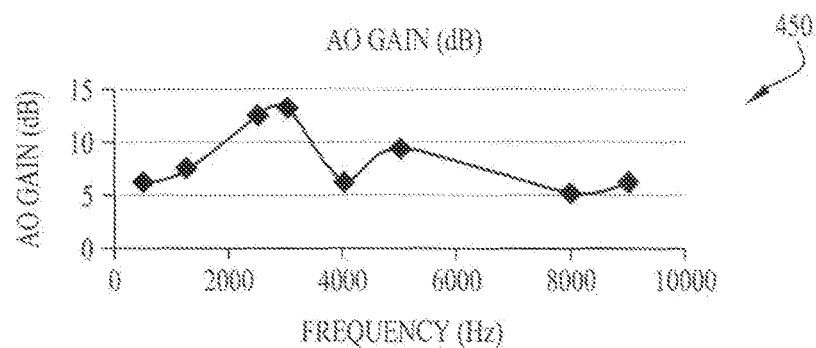
FIG. 4C is an exemplary graphical representation of the AO gain in decibels (dB) of the LDV amplitude for the frequency range of about 20 Hz to about 10 kHz, according to some embodiments of the invention.
Figure 4D:
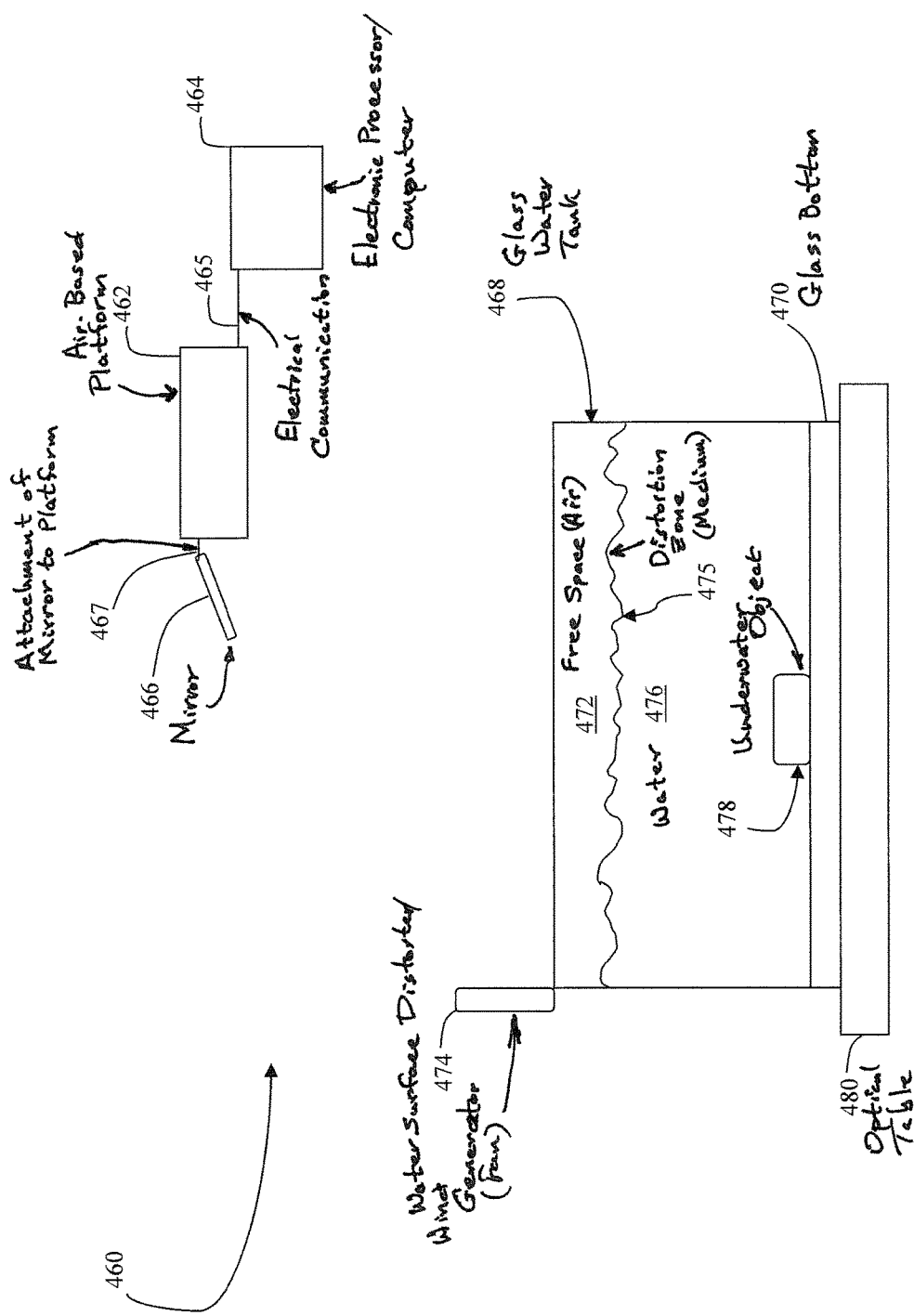
FIG. 4D is an side view of an exemplary laboratory testing environment illustrating a working example of a system, according to some embodiments of the invention.

FIG. 4D illustrates a physical laboratory system, according to embodiments of the invention, and is depicted by reference character 460. The system 460 used an air-based platform 462 to detect an underwater object 478. The air-based platform 462 was positioned about 36 inches above the underwater object 478. The air-based platform 462 positioning in the laboratory system 460 can be suspension from a ceiling, elevation from scaffolding or ladder, an elevated structure, or attachment to a drone. The air-based platform 462 was in electrical communication with an electronic processor, sometimes referred to as a computer 464. Reference character 465 is generically used for the electrical communication between the air-based platform 462 and the computer 464. The computer 464 was used for signal processing functions and for displaying, in conjunction with a visual display screen, the graphs in FIGS. 4A, 4B, & 4C. The air-based platform 462 included a broadband acousto-optical signal detection device (not shown for ease of viewing). A mirror 466 was attached to the air-based platform 462 and was used for directing and receiving optical beams. Reference character 467 is generically used for the attachment of the mirror 466 to the air-based platform 462. The underwater object 478 was in a glass water tank 468 filled with approximately twelve inches of water 476. The underwater object 478 had reflective tape on its upper surface, the surface closest to the air-based platform 462. Free space above the water surface is air 472. The water tank 468 had a glass bottom 470 resting on an optical table 480. A water surface distorter 474, sometimes referred to as a wind generator such as, for example, a fan, was positioned above the water surface and was used to create a distortion zone 475, sometimes referred to as a distorted region, or distorting region, or distorted medium. During testing, the water surface distorter 474 was set to a wind speed of about 7 miles per hour.

The transmitted and reflected laser beams are not specifically shown in FIG. 4D for ease of viewing and because the beams are discussed with respect to FIGS. 1, 2, 3, & 5. The broadband acousto-optic detection device was configured to emit a laser beam (such as reference character 506 in FIG. 5), sometimes referred to as a transmitter beam, transmitted beam, or reference beam at the underwater object 478. The laser beam 506 was a continuous beam, such as an unpulsed beam. The laser beam 506 can also be a pulsed beam if desired for blanking purposes. The laser beam 506 selected was a blue-green laser having a wavelength range of about 400 to 500 nanometers because of its ability to penetrate water.

The laser beam 506 (FIG. 5) terminated at the underwater object 478 in the glass water tank 468 and reflected back as a return laser beam 512 (FIG. 5), which is also referred to as a reflected laser beam, and a signal beam. The broadband acousto-optic signal detection device was configured to detect and receive the return laser beam 512.

Graphical representations of the test results obtained from the system illustrated in FIG. 4D are shown in FIGS. 4A through 4C, as a computer display screen, rendering visual verification that the system performs as expected. The takeaway from viewing FIGS. 4A through 4C is that practicing embodiments of the invention, as disclosed herein with the AO-on, yields improved, quantifiable, results when compared to the AO-off conditions.

The left graph of FIG. 4A, depicted by reference character 400A, is an exemplary graphical representation on a computer display screen of an LDV signal amplitude in arbitrary units (a.u.) with the AO-off for signal sensing at a frequency of 5000 Hz. The right graph of FIG. 4A, depicted by reference character 400B, is an exemplary graphical representation of an LDV signal on a computer display screen of an LDV signal amplitude in arbitrary units (a.u.) with the AO-on at a frequency of 5000 Hz. The right graph 400B of FIG. 4A (the AO-on condition) is the result when embodiments of the invention are practiced. The right graph 400B of FIG. 4 depicts the LDV signal amplitude using embodiments of the invention as disclosed herein, and further described with respect to FIG. 4D. The takeaway from FIG. 4A is that practicing the embodiments of the invention, with the AO-on as disclosed herein, results in an LDV signal amplitude that is about 9 to 10 times greater than during AO-off conditions.

The left graph of FIG. 4B, depicted by reference character 440A, is an exemplary graphical representation of the average Strehl ratio results for the AO-off conditions in an environment having a 7 mile per hour fan-generated wind speed. The right graph of FIG. 4B, depicted by reference character 440B, is an exemplary graphical representation of the average Strehl ratio results for the AO-on conditions in an environment having a 7 mile per hour fan-generated wind speed. The Strehl ratio is a metric for the effectiveness of an AO system. The AO-off conditions 440A correspond to open loop conditions. Conversely, the AO-on conditions 440B, corresponding to practicing embodiments of the invention as discussed herein, are closed loop conditions. A comparison of the FIG. 4B graphs shows that the AO-on (closed loop) conditions (440B), corresponding to embodiments configured as disclosed herein, yield a far greater Strehl ratio than the AO-off (closed loop) conditions (440A). The takeaway from FIG. 4B is that practicing the embodiments of the invention with the AO-on, as disclosed herein, results in a far greater percentage return (greater Strehl ratio) than during AO-off conditions.

FIG. 4C is an exemplary graphical representation of the AO gain in decibels (dB) of the LDV amplitude for the frequency range of about 20 Hz to about 10 kHz, according to some embodiments of the invention, and is depicted by reference character 450. FIG. 4C shows the AO gain (dB) experienced during AO-on conditions compared to AO-on conditions, and mathematically defined as:

$$10 \log_{10}\left(\frac{AO_{on}}{AO_{off}}\right) dB.$$

This parameter shows the range in which the system can detect a specific signal. In laboratory measurements, it was from about 6 to about 17 dB gain for a corresponding frequency range of about 20 Hz to about 10 kHz. The takeaway from FIG. 4C is that significant improvement in signal detection occurs in the AO-on conditions due to the AO optimization of the LDV signal in the distorted medium.

Figure 5:
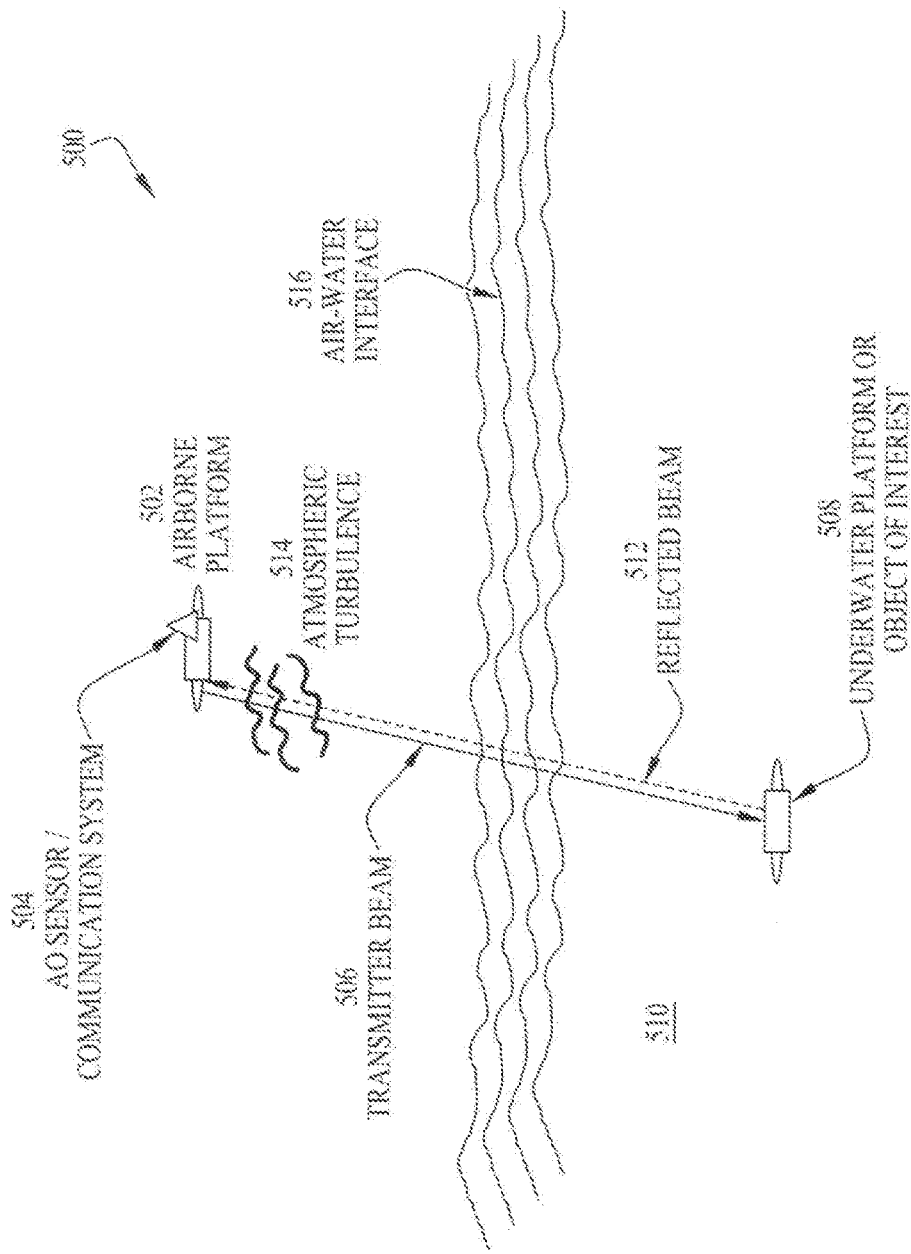
FIG. 5 is an exemplary system for remotely detecting an underwater object from a generic airborne platform, according to some embodiments of the invention.

Air-Based/Airborne Platform System & Operating Environment—FIG. 5

Referring to FIG. 5, an air-based system to detect an underwater object is depicted using reference character 500. The system 500 includes an air-based platform 502 associated with at least one controller (not depicted on the drawings). The air-based platform 502 can be manned or unmanned. The controller is at least one computer and can be referred to as a non-transitory computer readable medium. Embodiments of the invention are directed to non-transitory signals. A broadband acousto-optic signal detection device 504 is associated with the air-based platform 502. The broadband acousto-optic detection device 504 is configured to emit a laser beam 506, sometimes referred to as a transmitter beam, transmitted beam, or reference beam at an underwater object 508. The laser beam 506 can be continuous beam, such as an unpulsed beam. The laser beam 506 can also be a pulsed beam if desired for blanking purposes. The laser beam 506 is sometimes referred to as a reference beam. The laser beam 506 selected is a blue-green laser having a wavelength range of about 400 to 500 nanometers, because of its ability to penetrate water.

Reference character 510 is used to generically depict the water. The laser beam 506 terminates at the underwater object 508 and reflects back as a return laser beam 512, which is also referred to as a reflected laser beam, and a signal beam. The broadband acousto-optic signal detection device 504 is configured to detect and receive the return laser beam 512.

In embodiments, the broadband acousto-optic signal detection device 504 is a Laser Doppler Vibrometer (LDV) 100 coupled to an adaptive optics (AO) system/device 200. The LDV 100 houses and is mechanically-associated with a laser source 101, which emits and transmits the laser beam 506. The LDV 100 produces a Doppler shift in the return laser beam 512. The LDV 100 includes an interferometer that is used to measure frequency difference between the laser (reference) beam 506 and the return (signal) beam 512. The process is sometimes referred to as interferometrically processing for acoustic signal sensing/detection. The return laser beam/signal beam 512 comes back to the AO system 200. The reference beam reference beam 506 remains in the LDV 100.

A distorted medium 300 (depicted in FIG. 3), sometimes referred to as a distorting medium, is located between the air-based platform 502 and the underwater object 508. The distorted medium 300 includes an atmospheric turbulence zone 514 and an air-water interface turbulence zone 516. Each of the zones 514 & 516 are characterized by turbulent flow conditions.

The AO system/device 200 includes a wavefront sensor (WFS) 203 that is electrically-connected with a fast steering mirror (FSM) 204 and a deformable mirror 205. The WFS 203 measures quantitative distortions caused by both the atmospheric turbulence 514 and the air-water interface turbulence 516. A person having ordinary skill in the art will recognize that lower and upper modes, often called Zernike polynomials, are used in the optics field. The FSM 204 is used to mitigate the lower-order modes. The deformable mirror 205 uses phase-conjugation to undo the distortions and mitigate the higher-order modes. A feedback control system 206 is generically shown and is electrically-associated with the non-transitory computer readable medium. The feedback control system 206 and its associated computer executable instructions are included for signal processing of the lower and higher-order modes. For the AO system 200, the WFS 203 is the feedback control mechanism for the deformable mirror 205 and the FSM 204. Information gained after signal processing determines how to keep the beam still or stabilized in the presence of atmospheric turbulence and air-water interface turbulence.

Embodiments of the invention can be applied and used for any laser-based broad classes of sensors as long as matching AO system accepting the input laser wavelength is used. Additionally, embodiments of the invention are applicable to other configurations such as optical communications between the air-based/airborne platform and underwater terminals, and between under-water terminals with the system placed at both ends.

Embodiments of the invention are useful for the visual verification of the reflected beam 512 by visually verifying the Strehl ratio, which can be displayed on a visual display screen, sometimes referred to as a display monitor, and which is included in the embodiments (electrically-associated with the computer and the air-based platform 502). The display monitor/visual display screen is included in embodiments of the invention and is a tangible medium for displaying output, such as the respective LDV signal amplitudes in FIG. 4A, the respective Strehl ratios in FIG. 4B, and the AO gain in FIG. 4C. Other tangible outputs are possible without detracting from the merits or generality of embodiments of the invention. As such, in the embodiments, the tangible outputs may be shown and/or represented as a visual display screen depiction, hard copy printouts, as well as other media using the information such as, for example, a computer having computer-readable instructions that is configured to use output from embodiments of the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An air-based system to detect an underwater object, comprising:
    an air-based platform associated with at least one controller;
    a broadband acousto-optic signal detection device associated with said air-based platform, wherein said broadband acousto-optic signal detection device is configured to emit a laser beam at an underwater object, said laser beam terminates at said underwater object and reflects back as a return laser beam, wherein said broadband acousto-optic signal detection device is configured to detect and receive said return laser beam; and
    a distorted medium between said air-based platform and said underwater object, wherein said distorted medium produces signal distortions in said return laser beam generated by said underwater object;
    wherein said broadband acousto-optic signal detection device is a laser Doppler vibrometer (LDV) coupled to an adaptive optics (AO) system;
    wherein said AO system having a wavefront sensor electrically-connected to at least one fast-steering mirror (FSM) and at least one deformable mirror (DM).

2. The system according to claim 1, wherein said LDV produces a Doppler shift in said return laser beam.

3. The system according to claim 1, wherein said at least one controller is at least one computer.

4. The system according to claim 1, further comprising:
    a laser source mechanically-associated with said LDV, said laser source configured to emit said laser beam at said underwater object;
    wherein said laser beam is a blue-green laser having a wavelength range of about 400 nanometers to about 500 nanometers.

5. The system according to claim 1,
    wherein said distorted medium comprising an atmospheric turbulence zone and an air-water interface turbulence zone, wherein each of said atmospheric turbulence zone and said air-water interface turbulence zone are characterized by turbulent flow conditions.

6. A method for detecting a broadband acousto-optic signal from an underwater object, the method comprising:
    transmitting a laser beam from a laser Doppler vibrometer (LDV), through an adaptive optics (AO) system, through a distorted medium, and at an underwater object;
    stabilizing said laser beam propagated through said distorted medium, said distorted medium having both atmospheric turbulence and random air-water interface turbulence, wherein said laser beam is stabilized by applying an adaptive optics (AO) technique to a laser Doppler vibrometer (LDV) output beam, wherein said LDV vibrometer output beam is used to detect an acoustic-optical signal generated by said underwater object;

wherein said distorted medium produces signal distortions in said acoustic-optical signal generated by said underwater object;

sensing said acoustic-optical signal generated by said underwater object;

correcting said signal distortions and stabilizing said laser beam using said AO technique, yielding a corrected acoustic-optical signal;

reflecting said corrected acoustic-optical signal back to said LDV;

detecting said corrected acoustic-optical signal at said LDV; and processing said corrected acoustic-optical signal with a non-transitory computer readable medium having a plurality of computer executable instructions.

7. The method according to claim 6, wherein said correcting of said signal distortions in both of said atmospheric turbulence and said random air-water interface turbulence is by applying said AO technique, said AO technique, comprising:

measuring said signal distortions with a wavefront sensor, wherein said wavefront sensor is electrically-connected to at least one fast-steering mirror (FSM) and at least one deformable mirror (DM), wherein said wavefront sensor provides feedback to both of said at least one FSM and said at least one DM;

mitigating lower-order modes with said at least one FSM; and mitigating higher-order modes with said at least one (DM) by correcting said signal distortions using phase-conjugation.

8. The method according to claim 6, wherein said laser beam is a blue-green laser having a wavelength range of about 400 nanometers to about 500 nanometers.

9. The system according to claim 1, wherein said wavefront sensor is configured to measure said signal distortions and provide feedback to both of said at least one FSM and said at least one DM, wherein said FSM is configured to mitigate lower-order modes, wherein said DM is configured to mitigate higher-order modes by correcting said distortions using phase-conjugation.

* * * * *